United States Patent
Futatsumori et al.

(10) Patent No.: US 7,534,840 B2
(45) Date of Patent: May 19, 2009

(54) ROOM TEMPERATURE-CURABLE ORGANOPOLYSILOXANE COMPOSITIONS

(75) Inventors: Koji Futatsumori, Annaka (JP); Takayuki Matsuzawa, Annaka (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 395 days.

(21) Appl. No.: 11/580,861

(22) Filed: Oct. 16, 2006

(65) Prior Publication Data

US 2007/0088123 A1 Apr. 19, 2007

(30) Foreign Application Priority Data

Oct. 17, 2005 (JP) ............................. 2005-301247

(51) Int. Cl.
*C08L 83/04* (2006.01)

(52) U.S. Cl. ..................... 525/477; 528/18; 528/34; 524/588; 428/405

(58) Field of Classification Search ............... None
See application file for complete search history.

(56) References Cited

U.S. PATENT DOCUMENTS

| 4,417,042 A | 11/1983 | Dziark |
| 4,863,992 A | 9/1989 | Wengrovius et al. |
| 5,244,938 A | 9/1993 | Arai et al. |
| 6,528,580 B1 * | 3/2003 | Feder et al. ................. 524/801 |
| 2007/0232749 A1 * | 10/2007 | Ahmed et al. ............... 524/588 |

FOREIGN PATENT DOCUMENTS

| JP | 1-113429 A | 5/1989 |
| JP | 4-13382 B2 | 3/1992 |
| JP | 7-81079 A | 8/1995 |
| JP | 11-189720 A | 7/1999 |
| JP | 2000-7918 A | 1/2000 |

* cited by examiner

*Primary Examiner*—Marc S Zimmer
(74) *Attorney, Agent, or Firm*—Birch, Stewart, Kolasch & Birch, LLP

(57) ABSTRACT

A RTV organopolysiloxane composition comprising (A) an organopolysiloxane containing at least two Si—OH or organoxy radicals and having a viscosity of at least 500 mPa-s at 25° C., (B) an organosilane containing at least two organoxy radicals, (C) an organotin catalyst, and (D) an Si—OH radical-containing organopolysiloxane having a viscosity of up to 300 mPa-s at 25° C. It has shelf stability and discoloration resistance in the uncured state and exhibits rubber elasticity and adhesion in the cured state.

5 Claims, No Drawings

ROOM TEMPERATURE-CURABLE ORGANOPOLYSILOXANE COMPOSITIONS

CROSS-REFERENCE TO RELATED APPLICATION

This non-provisional application claims priority under 35 U.S.C. §119(a) on Patent Application No. 2005-301247 filed in Japan on Oct. 17, 2005, the entire contents of which are hereby incorporated by reference.

TECHNICAL FIELD

This invention relates to room temperature-curable organopolysiloxane compositions of the alcohol-release type which have improved shelf stability and discoloration resistance in the uncured state and exhibit improved rubber elasticity and adhesion in the cured state, so that they are suited for use as sealing agents, adhesives, coating agents, or potting agents. It is noted that the term "room temperature-curable" is often referred to as RTV as it is synonymous with room temperature-vulcanizable.

BACKGROUND ART

Silicone compositions of the condensation cure type are used as sealing agents, adhesives, coating agents or potting agents in a wide variety of areas including buildings, constructions, electric and electronic equipment and components, transporting vehicles, electric appliances and the like. Most of the silicone-based sealing, adhesive, coating or potting compositions of the condensation cure type used in these applications use organosilicon compounds containing at least three silicon-bonded hydrolyzable radicals in the molecule and/or partial hydrolyzates thereof as the crosslinker. These organosilicon compounds essentially refer to trifunctional hydrolyzable silanes and/or partial hydrolyzates thereof, examples of which include alkyltrimethoxysilanes, alkyltributanoximesilanes, alkyltriacetoxysilanes, and alkyltriisopropenoxysilanes or partial hydrolyzates thereof. Of these compositions, corrosion and safety aspects place greater concerns on one-part, alcohol-release type, room temperature-curable organopolysiloxane compositions using alcohol-releasable crosslinkers.

In the application where transparency is required, RTV organopolysiloxane compositions generally rely on tin-based catalysts rather than titanium-based catalysts which tend to give rise to a discoloration problem. The tin compounds, however, induce degradation of siloxane chains by alcohol so that the compositions become less curable during long-term sealed storage in the uncured state. In order to improve the shelf stability, it is well known to use alcohol scavengers as typified by silazane compounds having an Si—N bond. The use of such scavengers, however, tends to detract from adhesion.

Also in the sealant application, compositions having improved adhesion as well as rubber elasticity are generally desired.

Reference should be made to Dziark, U.S. Pat. No. 4,417,042 (JP-B 4-13382), Wengrovius et al., U.S. Pat. No. 4,863,992 (JP-A 1-113429), JP-A 11-189720, JP-A 2000-7918 and JP-B 7-81079.

DISCLOSURE OF THE INVENTION

An object of the present invention is to provide RTV organopolysiloxane compositions of the alcohol-release type which have improved shelf stability and discoloration resistance in the uncured state and exhibit improved rubber elasticity and adhesion in the cured state, so that they are suited for use as sealing agents, adhesives, coating agents, or potting agents.

The inventors have found that a RTV organopolysiloxane composition comprising (A) 100 parts by weight of an organopolysiloxane containing at least two Si—OH radicals or at least two organoxy radicals in the molecule and having a viscosity of at least 500 mPa·s at 25° C., (B) 0.5 to 20 parts by weight of an organosilane containing at least two organoxy radicals in the molecule or a partial hydrolyzate thereof, (C) 0.01 to 10 parts by weight of an organotin catalyst, and (D) 1 to 30 parts by weight of an Si—OH radical-containing organopolysiloxane represented by the average compositional formula (1):

$$(HO)_a(R^1O)_bR_cSiO_{(4-a-b-c)/2} \quad (1)$$

wherein R and $R^1$ are each independently a substituted or unsubstituted monovalent hydrocarbon radical, the subscripts a, b and c are numbers satisfying $0.01<a<0.2$, $0 \leq b<0.4$, $1.7<c<1.9$, and $1.6<a+b+c<2.5$, and having a viscosity of up to 300 mPa·s at 25° C. has improved shelf stability and discoloration resistance in the uncured state and exhibit improved rubber elasticity and adhesion in the cured state, so that they are suited for use as sealing agents, adhesives, coating agents, potting agents or the like. That is, the incorporation of the specific organopolysiloxane (D) in an RTV organopolysiloxane composition of the alcohol-release type results in an RTV organopolysiloxane composition which remains shelf stable and discoloration resistant in the uncured state and cures into a product possessing excellent rubber elasticity and bond strength.

According to the invention, there is provided a room temperature-curable organopolysiloxane composition comprising (A) 100 parts by weight of an organopolysiloxane containing at least two Si—OH radicals or at least two organoxy radicals in the molecule and having a viscosity of at least 500 mPa·s at 25° C., (B) 0.5 to 20 parts by weight of an organosilane containing at least two organoxy radicals in the molecule or a partial hydrolyzate thereof, (C) 0.01 to 10 parts by weight of an organotin catalyst, and (D) 1 to 30 parts by weight of an Si—OH radical-containing organopolysiloxane represented by the average compositional formula (1):

$$(HO)_a(R^1O)_bR_cSiO_{(4-a-b-c)/2} \quad (1)$$

wherein R and $R^1$ are each independently a substituted or unsubstituted monovalent hydrocarbon radical, the subscripts a, b and c are numbers satisfying $0.01<a<0.2$, $0 \leq b<0.4$, $1.7<c<1.9$, and $1.6<a+b+c<2.5$, and having a viscosity of up to 300 mPa·s at 25° C.

In a preferred embodiment, the organopolysiloxane (A) is at least one member selected from the group consisting of diorganopolysiloxanes having the general formula (2):

$$(HO)(R_2SiO)_kH \quad (2)$$

wherein R is each independently a substituted or unsubstituted monovalent hydrocarbon radical and k is an integer of at least 100 and polysiloxanes having the general formula (3):

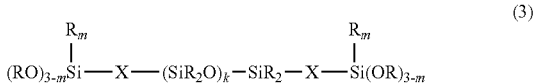

$$(RO)_{3-m}\underset{\underset{R_m}{|}}{Si}-X-(SiR_2O)_k-SiR_2-X-\underset{\underset{R_m}{|}}{Si}(OR)_{3-m} \tag{3}$$

wherein R and k are as defined above, X is an oxygen atom or an alkylene radical of 2 to 5 carbon atoms, and m is an integer of 0 or 1.

In a preferred embodiment, the composition may further comprise (E) 1 to 500 parts by weight of a filler and/or (F) 0.1 to 2 parts by weight of an organosilazane having the general formula (4):

$$(R_3Si)_2NH \tag{4}$$

wherein R is as defined above.

The composition is typically used as a sealing agent, adhesive, coating agent or potting agent.

BENEFITS OF THE INVENTION

The RTV organopolysiloxane compositions of the invention remain shelf stable and discoloration resistant in the uncured state and cure into products possessing excellent rubber elasticity and bond strength. They are suited for use as sealing agents, adhesives, coating agents, potting agents or the like.

DESCRIPTION OF THE PREFERRED EMBODIMENT

Component A

Component (A) in the RTV organopolysiloxane composition of the invention is an organopolysiloxane containing at least two Si—OH radicals or at least two organoxy radicals in the molecule and having a viscosity of at least 500 mPa-s at 25° C.

The preferred organopolysiloxanes (A) include diorganopolysiloxanes having the general formula (2) or (3), with the diorganopolysiloxanes of formula (3) being more preferred for better long-term shelf stability and adhesion.

$$(HO)(R_2SiO)_kH \tag{2}$$

Herein R which may be the same or different is a substituted or unsubstituted monovalent hydrocarbon radical and k is an integer of at least 100.

$$(RO)_{3-m}\underset{\underset{R_m}{|}}{Si}-X-(SiR_2O)_k-SiR_2-X-\underset{\underset{R_m}{|}}{Si}(OR)_{3-m} \tag{3}$$

Herein R and k are as defined above, X is an oxygen atom or an alkylene radical of 2 to 5 carbon atoms, and m is an integer of 0 or 1.

In formula (2) or (3), R is each independently selected from substituted or unsubstituted monovalent hydrocarbon radicals, including alkyl radicals of 1 to 20 carbon atoms, more specifically 1 to 6 carbon atoms, alkenyl radicals of 2 to 20 carbon atoms, more specifically 2 to 6 carbon atoms, aryl radicals of 6 to 20 carbon atoms, more specifically 6 to 12 carbon atoms, and substituted forms of the foregoing in which some hydrogen atoms are substituted by halogen atoms. Suitable alkyl radicals include methyl, ethyl, propyl and cyclohexyl; suitable alkenyl radicals include vinyl and allyl; a typical aryl radical is phenyl; and a typical halogen-substituted radical is 3,3,3-trifluoropropyl. The subscript k is such an integer of at least 100 that the diorganopolysiloxane may have a viscosity at 25° C. in the range of 500 to 100,000 mPa-s, preferably 1,000 to 50,000 mPa-s. It is noted that the viscosity is measured by a rotational viscometer.

The compound of formula (3) may be readily prepared by heating a compound of formula (2) and an alkoxy-containing silane in the presence of an amine such as isopropylamine, butylamine or dibutylamine, or by effecting addition reaction of a silane containing hydrosilyl and alkoxy radicals to a corresponding alkenylsiloxane or of a silane containing alkenyl and alkoxy radicals to a corresponding hydrosiloxane in the presence of a catalyst.

Component B

Component (B) is an organosilane containing at least two organoxy radicals in the molecule or a partial hydrolyzate thereof. It essentially serves as a curing agent when the compound of formula (2) is used as component (A), and as a shelf stabilizer when the compound of formula (3) is used as component (A).

The organoxy-containing organosilanes (B) include compounds having the following formula (5).

$$R^2{}_{4-n}Si(OR^3)_n \tag{5}$$

Herein $R^2$ which may be the same or different is a substituted or unsubstituted monovalent hydrocarbon radical, specifically having 1 to 20 carbon atoms, more specifically 1 to 6 carbon atoms, examples of which are as exemplified above for R. $R^3$ is a monovalent organic radical of 1 to 10 carbon atoms, preferably 1 to 6 carbon atoms. Examples of $OR^3$ include alkoxy radicals such as methoxy, ethoxy, propoxy, n-butoxy, isobutoxy, and tert-butoxy; acyloxy radicals such as acetoxy; and acryloxy, methacryloxy, phenoxy and other radicals. The subscript n is equal to 2, 3 or 4, and preferably 2 or 3. A typical organosilane is methyltrimethoxysilane.

Component (B) is compounded in an amount of 0.5 to 20 parts by weight, preferably 2 to 10 parts by weight per 100 parts by weight of component (A). With less than 0.5 pbw, no satisfactory rubber physical properties are obtainable or the composition will thicken or gel during shelf storage. More than 20 pbw deprives the cured composition of rubber elasticity.

Component C

Component (C) is an organotin catalyst which serves as a reaction catalyst for components (A) and (B) in the composition and also serves as a reaction catalyst for component (A) having formula (3). Suitable catalysts include tin ester compounds such as tin dioctoate, and alkyltin ester compounds such as dibutyltin diacetate, dibutyltin dilaurate, and dibutyltin dioctoate and may be used alone or in admixture. The use of these tin compounds ensures that transparent cured compositions have discoloration resistance.

Of these tin compounds, preference is given to secondary or tertiary organic acid-derived dialkyltin esters such as dioctyltin dineodecanoate and dibutyltin di(2-ethylhexoate) for long-term shelf stability.

Component (C) is compounded in an amount of 0.01 to 10 parts by weight, preferably 0.05 to 5 parts by weight per 100 parts by weight of component (A). Less than 0.01 pbw fails to provide curing properties, whereas more than 10 pbw renders the composition less durable.

In the practice of the invention, co-catalysts may be used in addition to the organotin catalysts. Suitable co-catalysts include titanate esters or titanium chelates such as tetraisopropoxytitanium, tetra-n-butoxytitanium, tetrakis(2-ethylhexoxy)titanium, dipropoxybis(acetylacetonato)titanium, and titanium isopropoxyoctylene glycol; organometallic compounds such as zinc naphthenate, zinc stearate, zinc 2-ethyloctoate, iron 2-ethylhexoate, cobalt 2-ethylhexoate, manganese 2-ethylhexoate, cobalt naphthenate, and alkoxyaluminum compounds; aminoalkyl-substituted alkoxysilanes such as 3-aminopropyltriethoxysilane and N-(β-aminoethyl)-γ-aminopropyltrimethoxysilane; amine compounds and salts thereof such as hexylamine, dodecylamine phosphate, tetramethylguanidine and diazabicyclononane; quaternary ammonium salts such as benzyltriethylammonium acetate; alkali metal salts of lower fatty acids such as potassium acetate, sodium acetate and lithium oxalate; dialkylhydroxylamines such as dimethylhydroxylamine and diethylhydroxylamine; and guanidyl-containing silanes or siloxanes such as tetramethylguanidylpropyltrimethoxysilane, tetramethylguanidylpropylmethyldimethoxysilane and tetramethylguanidylpropyltris(trimethylsiloxy)silane. Of these, preferred are the amine compounds such as tetramethylguanidine and diazabicyclononane, and the guanidyl-containing silanes or siloxanes such as tetramethylguanidylpropyltrimethoxysilane, tetramethylguanidylpropylmethyldimethoxysilane and tetramethylguanidylpropyltris(trimethylsiloxy)silane.

Component D

Component (D) is an Si—OH radical-containing organopolysiloxane represented by the average compositional formula (1) and having a viscosity of up to 300 mPa·s at 25° C.

$$(HO)_a(R^1O)_bR_cSiO_{(4-a-b-c)/2} \quad (1)$$

Herein each of R and $R^1$ which may be the same or different is a substituted or unsubstituted monovalent hydrocarbon radical, the subscripts a, b and c are numbers satisfying $0.01<a<0.2$, $0\leq b<0.4$, $1.7<c<1.9$, and $1.6<a+b+c<2.5$. Component (D) is essential for improving the adhesion of the composition and the elongation of a rubber sheet obtained therefrom after curing.

In formula (1), R is as defined and exemplified above. $R^1$ is preferably as illustrated above for $R^3$, and examples of $OR^1$ are as exemplified above for $OR^3$.

If a is equal to or less than 0.01, improvements in adhesion and elongation of cured rubber sheet are insufficient. If a is equal to or more than 0.2, the resulting composition may be reduced in shelf stability. Values of b equal to or more than 0.4 are undesirable because a cured rubber sheet may be reduced in elongation.

Component (D) should have a viscosity of up to 300 mPa·s at 25° C. and preferably 5 to 250 mPa·s at 25° C.

Component (D) is compounded in an amount of 1 to 30 parts by weight, preferably 2 to 15 parts by weight per 100 parts by weight of component (A). On this basis, less than 1 pbw of component (D) fails to achieve sufficient improvements in adhesion and elongation, whereas more than 30 pbw detracts from the shelf stability of the composition.

Component (D) may be obtained through hydrolysis of mainly dichlorodiorganosilanes or trichloroorganosilanes or hydrolysis of alkoxyl derivatives of the foregoing compounds.

Component E

In the inventive composition, a filler may be compounded as component (E) if desired. The filler (E) serves as a reinforcing or extending agent in the composition. Suitable fillers include surface treated and/or untreated fumed silica, wet silica, precipitated silica, metal oxides, metal hydroxides, metal carbonates, glass beads, glass balloons, resin beads, resin balloons, and the like. Fumed silica, precipitated silica and calcium carbonate are preferred. These fillers may be used alone or in admixture. Of these, fumed silica is most preferred particularly when the composition has to cure into a transparent product.

Preferably the filler (E) is used in an amount of 1 to 500 parts by weight, more preferably 5 to 250 parts by weight per 100 parts by weight of component (A). On this basis, less than 1 pbw of the filler may fail to achieve the reinforcing or extending effect whereas more than 500 pbw may cause difficulty in discharging the composition, detracting from workability.

Component F

In the inventive composition, an organosilazane may be compounded as component (F) if desired. The organosilazane (F) is an alcohol scavenger for improving shelf stability. Specifically, a disilazane compound having the following formula (4):

$$(R_3Si)_2NH \quad (4)$$

wherein R is as defined above is compounded. Examples of the disilazane compound include hexamethyldisilazane and divinyltetramethyldisilazane.

Preferably component (F) is used in an amount of 0.2 to 10 parts by weight, more preferably 0.5 to 4 parts by weight per 100 parts by weight of component (A). On this basis, less than 0.2 pbw may fail to achieve the shelf stabilizer effect whereas more than 10 pbw may reduce the adhesion of the composition.

Additional Components

In the composition of the invention, a silane coupling agent may be compounded as an adhesion promoter if a further adhesion improvement is desired. Any silane coupling agents known in the art may be used. Preferred are those silane coupling agents having an alkoxysilyl or alkenoxysilyl group as the hydrolyzable group, including vinyltris(β-methoxyethoxy)silane, γ-methacryloxypropyltrimethoxysilane, β-(3,4-epoxycyclohexyl)ethyltrimethoxysilane, γ-glycidoxypropyltrimethoxysilane, γ-glycidoxypropylmethyldiethoxysilane, N-(β-aminoethyl)-γ-aminopropyltrimethoxysilane, γ-aminopropyltriethoxysilane, γ-mercaptopropyltrimethoxysilane, γ-glycidoxypropyltriisopropenoxysilane, and γ-glycidoxypropylmethyldiisopropenoxysilane. Inter alia, amine-based silane coupling agents are desirable.

Preferably the silane coupling agent is used in an amount of 0.1 to 20 parts by weight, more preferably 0.2 to 10 parts by weight per 100 parts by weight of component (A). On this basis, less than 0.1 pbw may fail to promote adhesion whereas more than 10 pbw is economically disadvantageous.

A variety of well-known additives may be added to the composition of the invention insofar as they do not adversely affect the benefits of the invention. Suitable additives include thixotropic agents such as polyethers, plasticizers such as silicone oil and isoparaffins, and crosslinking density improvers such as network polysiloxane composed of trimethylsiloxy and $SiO_2$ units. Optionally there may also be added colorants such as pigments, dyes and fluorescent brighteners, biologically active agents such as mildew-proof agents, antifungal agents, insect repellents and marine organism repellents, bleed oils such as phenylsilicone oil and fluorosilicone oil, surface modifiers such as silicone-incompatible organic liquids, and solvents such as toluene, xylene, gasoline, cyclohexane, methylcyclohexane, and low-boiling isoparaffins.

The organopolysiloxane composition is obtainable by intimately mixing the above-mentioned essential and optional components by a standard technique. The composition may take either a one-part system or a two-part system although the one-part system is preferred.

The organopolysiloxane compositions of the invention thus obtained are RTV organopolysiloxane compositions which remain shelf stable and discoloration resistant in the uncured state and cure into products having improved rubber elasticity and adhesion. They are thus suited for use as sealing agents, adhesives, coating agents, potting agents or the like.

The curing conditions for the organopolysiloxane compositions of the invention may be the same as used for conventional RTV silicone rubber compositions of the condensation cure type. In general, they perform well in an environment having a temperature of 5 to 40° C. and a relative humidity (RH) of 10 to 90%.

EXAMPLE

Examples of the invention are given below by way of illustration and not by way of limitation. Note that all parts are by weight, and the viscosity is a measurement at 25° C. by a rotational viscometer. Me is methyl.

Properties of compositions were evaluated by the following procedure.

A cartridge filled with each of Compositions #1 to #8 to be demonstrated later was held for 2 days at room temperature, after which the composition was cured and evaluated. These compositions and values are denoted as "initial". The cartridge was held for 14 days in a drier at 70° C. and then for one day at room temperature, after which the composition was cured and evaluated. These compositions and values are denoted as "70° C./14 days".

The initial and 70° C./14 days storage compositions were worked into sheets of 2 mm thick and cured for 7 days in an atmosphere of 23° C. and 55% RH. Physical properties of the cured sheets were examined according to JIS K6301. The results are shown in Table 1.

Example 1

To 50 parts of a dimethylpolysiloxane blocked at each polymer end with a trimethoxysilyl radical and having a viscosity of 50,000 mPa-s as component (A) were added 3 parts of methyltrimethoxysilane as component (B), 0.05 part of dioctyltin dineodecanoate as component (C), 4 parts of an organopolysiloxane represented by the compositional formula:

$(HO)_{0.05}Me_{1.75}SiO_{1.1}$ and having a Si—OH content of 0.06 mol/100 g and a viscosity of 60 mPa-s as component (D), 13 parts of silica R972 (trade name, Nippon Aerosil Co., Ltd.) as component (E), 0.5 part of hexamethyldisilazane as component (F), 35 parts of a dimethylpolysiloxane blocked at each polymer end with a trimethylsilyl radical and having a viscosity of 100 mPa-s, and 0.5 part of N-(β-aminoethyl)-γ-aminopropyltrimethoxysilane. They were mixed until uniform, obtaining Composition #1. A cartridge with a volume of 330 ml was filled with this composition. The test results of this composition are shown in Table 1.

Example 2

Composition #2 was prepared as in Example 1 except that 1 part of methyltrimethoxysilane and 2 parts of dimethyldimethoxysilane were used instead of 3 parts of methyltrimethoxysilane as component (B). The test results of this composition are shown in Table 1.

Example 3

Composition #3 was prepared as in Example 1 except that 4 parts of an organopolysiloxane represented by the compositional formula:

$(HO)_{0.03}(MeO)_{0.22}Me_{1.84}SiO_{0.96}$ and having a Si—OH content of 0.04 mol/100 g and a viscosity of 16 mPa-s was used instead of the organopolysiloxane represented by the compositional formula: $(HO)_{0.05}Me_{1.75}SiO_{1.1}$ and having a Si—OH content of 0.06 mol/100 g and a viscosity of 60 mPa-s as component (D). The test results of this composition are shown in Table 1.

Comparative Example 1

Composition #4 was prepared as in Example 1 except that the organopolysiloxane represented by the compositional formula: $(HO)_{0.05}Me_{1.75}SiO_{1.1}$ and having a Si—OH content of 0.06 mol/100 g and a viscosity of 60 mPa-s as component (D) was omitted. The test results of this composition are shown in Table 1.

Comparative Example 2

Composition #5 was prepared as in Example 1 except that 4 parts of a silanol-terminated polydiorganosiloxane represented by the compositional formula: $HO—(SiMe_2O)_{12}—H$ and having a Si—OH content of 0.22 mol/100 g was used instead of the organopolysiloxane represented by the compositional formula: $(HO)_{0.05}Me_{1.75}SiO_{1.1}$ and having a Si—OH content of 0.06 mol/100 g and a viscosity of 60 mPa-s as component (D). The test results of this composition are shown in Table 1.

Comparative Example 3

Composition #6 was prepared as in Comparative Example 2 except that the amount of the silanol-terminated polydiorganosiloxane represented by the compositional formula: $HO—(SiMe_2O)_{12}—H$ and having a Si—OH content of 0.22 mol/100 g was changed from 4 parts to 1.1 parts. This change suggests that the Si—OH content resulting from the addition of said compound was equivalent to that of component (D) in Example 1. The test results of this composition are shown in Table 1.

TABLE 1

| Storage condition | Test items | Example 1 Composition #1 | Example 2 Composition #2 | Example 3 Composition #3 | Comparative Example 1 Composition #4 | Comparative Example 2 Composition #5 | Comparative Example 3 Composition #6 |
|---|---|---|---|---|---|---|---|
| Initial | Tack-free time (min) | 3 | 4 | 4 | 2 | 2 | 2 |
| | Hardness (JIS-A) | 15 | 13 | 14 | 18 | 23 | 19 |
| | Elongation (%) | 610 | 730 | 620 | 480 | 360 | 450 |
| | Tensile strength (MPa) | 1.6 | 1.3 | 1.4 | 1.5 | 1.4 | 1.5 |
| | Shear bond strength to aluminum (MPa) | 1.3 | 1.2 | 1.2 | 1.4 | 1.1 | 1.3 |
| | Cohesive failure (%) | 100 | 100 | 100 | 40 | 50 | 40 |
| 70° C./14 days | Tack-free time (min) | 2 | 3 | 3 | 2 | 4 | 3 |
| | Yellowing | no | no | no | no | no | no |
| | Hardness (JIS-A) | 17 | 13 | 13 | 16 | 12 | 14 |
| | Elongation (%) | 600 | 710 | 580 | 460 | 300 | 380 |
| | Tensile strength (MPa) | 1.5 | 1.5 | 1.4 | 1.2 | 0.7 | 0.9 |
| | Shear bond strength to aluminum (MPa) | 1.3 | 1.2 | 1.2 | 1.4 | 0.5 | 0.7 |
| | Cohesive failure (%) | 100 | 100 | 100 | 20 | 20 | 30 |

It is seen from Table 1 that as compared with Comparative Examples 1 to 3, Examples 1 to 3 are superior in elongation (%) and cohesive failure (%) at both the initial and 70° C./14 days storage states. This demonstrates that the compositions develop high rubber elasticity and adhesion not only at the initial, but also after long-term storage.

Example 4

50 parts of a dimethylpolysiloxane blocked at each polymer end with a hydroxyl radical and having a viscosity of 50,000 mPa-s as component (A) was mixed with 3 parts of methyltrimethoxysilane as component (B) and 1.25 parts of a mixture of dibutylamine/acetic acid/methyltrimethoxysilane in a weight ratio of 2/0.5/10. The mixture was held at 70° C. for 2 hours and then cooled to room temperature. To the mixture were added 0.2 part of a 50% toluene solution of dibutyltin di(2-ethylhexoate) as component (C), 4 parts of an organopolysiloxane represented by the compositional formula:

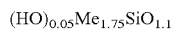
$(HO)_{0.05}Me_{1.75}SiO_{1.1}$ and having a Si—OH content of 0.06 mol/100 g and a viscosity of 60 mPa-s as component (D), 13 parts of silica R972 (trade name, Nippon Aerosil Co., Ltd.) as component (E), 1 part of hexamethyldisilazane as component (F), 35 parts of a dimethylpolysiloxane blocked at each polymer end with a trimethylsilyl radical and having a viscosity of 100 mPa-s, and 0.5 part of N-(β-aminoethyl)-γ-aminopropyltrimethoxysilane. They were mixed until uniform, obtaining Composition #7. A cartridge with a volume of 330 ml was filled with this composition. The test results of this composition are shown in Table 2.

Comparative Example 4

Composition #8 was prepared as in Example 4 except that the organopolysiloxane represented by the compositional formula: $(HO)_{0.05}Me_{1.75}SiO_{1.1}$ and having a Si—OH content of 0.06 mol/100 g and a viscosity of 60 mPa-s as component (D) was omitted. The test results of this composition are shown in Table 2.

TABLE 2

| Storage condition | Test items | Example 4 Composition #7 | Comparative Example 4 Composition #8 |
|---|---|---|---|
| Initial | Tack-free time (min) | 2 | 2 |
| | Hardness (JIS-A) | 15 | 17 |
| | Elongation (%) | 540 | 420 |
| | Tensile strength (MPa) | 1.4 | 1.3 |
| | Shear bond strength to aluminum (MPa) | 1.2 | 1.1 |
| | Cohesive failure (%) | 100 | 30 |
| 70° C./14 days | Tack-free time (min) | 2 | 2 |
| | Yellowing | no | no |
| | Hardness (JIS-A) | 14 | 15 |
| | Elongation (%) | 520 | 410 |
| | Tensile strength (MPa) | 1.2 | 1.0 |
| | Shear bond strength to aluminum (MPa) | 1.0 | 1.0 |
| | Cohesive failure (%) | 80 | 20 |

It is seen from Table 2 that as compared with Comparative Example 4, Example 4 is superior in elongation (%) and cohesive failure (%) at both the initial and 70° C./14 days storage states. This demonstrates that the compositions develop high rubber elasticity and adhesion not only at the initial, but also after long-term storage.

Japanese Patent Application No. 2005-301247 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A room temperature-curable organopolysiloxane composition comprising
 (A) 100 parts by weight of an organopolysiloxane containing at least two Si—OH radicals or at least two organoxy radicals in the molecule and having a viscosity of at least 500 mPa-s at 25° C.,
 (B) 0.5 to 20 parts by weight of an organosilane containing at least two organoxy radicals in the molecule or a partial hydrolyzate thereof,
 (C) 0.01 to 10 parts by weight of an organotin catalyst, and (D) 1 to 30 parts by weight of an Si—OH radical-containing organopolysiloxane represented by the average compositional formula (1):

$$(HO)_a(R^1O)_b R_c SiO_{(4-a-b-c)/2} \quad (1)$$

wherein R and $R^1$ are each independently a substituted or unsubstituted monovalent hydrocarbon radical, the subscripts a, b and c are numbers satisfying $0.01<a<0.2$, $0\leq b<0.4$, $1.7<c<1.9$, and $1.6<a+b+c<2.5$, and having a viscosity of up to 300 mPa-s at 25° C.

2. The composition of claim 1 wherein the organopolysiloxane (A) is at least one member selected from the group consisting of diorganopolysiloxanes having the general formula (2):

$$(HO)(R_2SiO)_k H \quad (2)$$

wherein R is each independently a substituted or unsubstituted monovalent hydrocarbon radical and k is an integer of at least 100 and polysiloxanes having the general formula (3):

$$(RO)_{3-m}\overset{R_m}{\underset{|}{Si}}-X-(SiR_2O)_k-SiR_2-X-\overset{R_m}{\underset{|}{Si}}(OR)_{3-m} \quad (3)$$

wherein R and k are as defined above, X is an oxygen atom or an alkylene radical of 2 to 5 carbon atoms, and m is an integer of 0 or 1.

3. The composition of claim 1, further comprising (E) 1 to 500 parts by weight of a filler.

4. The composition of claim 1, further comprising (F) 0.1 to 2 parts by weight of an organosilazane having the general formula (4):

$$(R_3Si)_2NH \quad (4)$$

wherein R is as defined above.

5. The composition of claim 1 which is used as a sealing agent, adhesive, coating agent or potting agent.

* * * * *